United States Patent
Daoud

(10) Patent No.: US 6,818,344 B2
(45) Date of Patent: Nov. 16, 2004

(54) THERMAL BATTERY

(75) Inventor: Sami Daoud, Bedford, NH (US)

(73) Assignee: Textron Systems, Wilmington, MA (US)

( * ) Notice: Subject to any disclaimer, the term of this patent is extended or adjusted under 35 U.S.C. 154(b) by 352 days.

(21) Appl. No.: 10/122,547

(22) Filed: Apr. 12, 2002

(65) Prior Publication Data

US 2003/0194602 A1 Oct. 16, 2003

(51) Int. Cl.[7] .......................... H01M 6/36; H01M 2/02
(52) U.S. Cl. ..................... 429/112; 429/115; 429/57; 429/103; 429/163
(58) Field of Search .................... 429/102–104, 429/110–112, 115, 163, 57

(56) References Cited

U.S. PATENT DOCUMENTS

| | | | |
|---|---|---|---|
| 5,252,413 A | 10/1993 | Alamgir et al. | |
| 5,350,645 A | 9/1994 | Lake et al. | 429/124 |
| 5,360,686 A | 11/1994 | Peled et al. | |
| 5,645,960 A | 7/1997 | Scrosati et al. | 429/219 |
| 5,895,730 A | 4/1999 | Ritchie | 429/103 |
| 6,022,637 A | 2/2000 | Wilson | 429/112 |
| 6,198,249 B1 | 3/2001 | Kroll et al. | 320/104 |
| 2003/0070575 A1 * | 4/2003 | Daoud | 102/531 |

OTHER PUBLICATIONS

Park, et al., "Reaction Intermediate in Thermal Decomposition of 1,3–Disilabutane to Silicon Carbide on Si(I11) Comparative Study of Cs+ Reactive Ion Scattering and Secondary Ion Mass Spectrometry", Jan. 5, 2000, pp. 117–125.

* cited by examiner

*Primary Examiner*—Tracy Dove
(74) *Attorney, Agent, or Firm*—Mills & Onello, LLP

(57) ABSTRACT

A thermal battery is housed in a chamber that utilizes micro-electromechanical systems (MEMS)-based technology to offer superior chemical stability and advantageous mechanical and thermal properties. The thermal battery of the present invention is activated by heat, for example heat generated by a pyrotechnic charge, for example thermite, for immediate and thorough activation of the electrolyte. The anode, cathode and electrolyte of the battery are formed of pellets having a curved interface for increased current density. The electrolyte preferably comprises a three-component eutectic salt mixture. In this manner, the thermal battery of the present invention is well suited for applications that require highly integrated thermal batteries that are relatively small in physical size, yet are capable of reliable performance over a wide range of operating conditions.

62 Claims, 5 Drawing Sheets

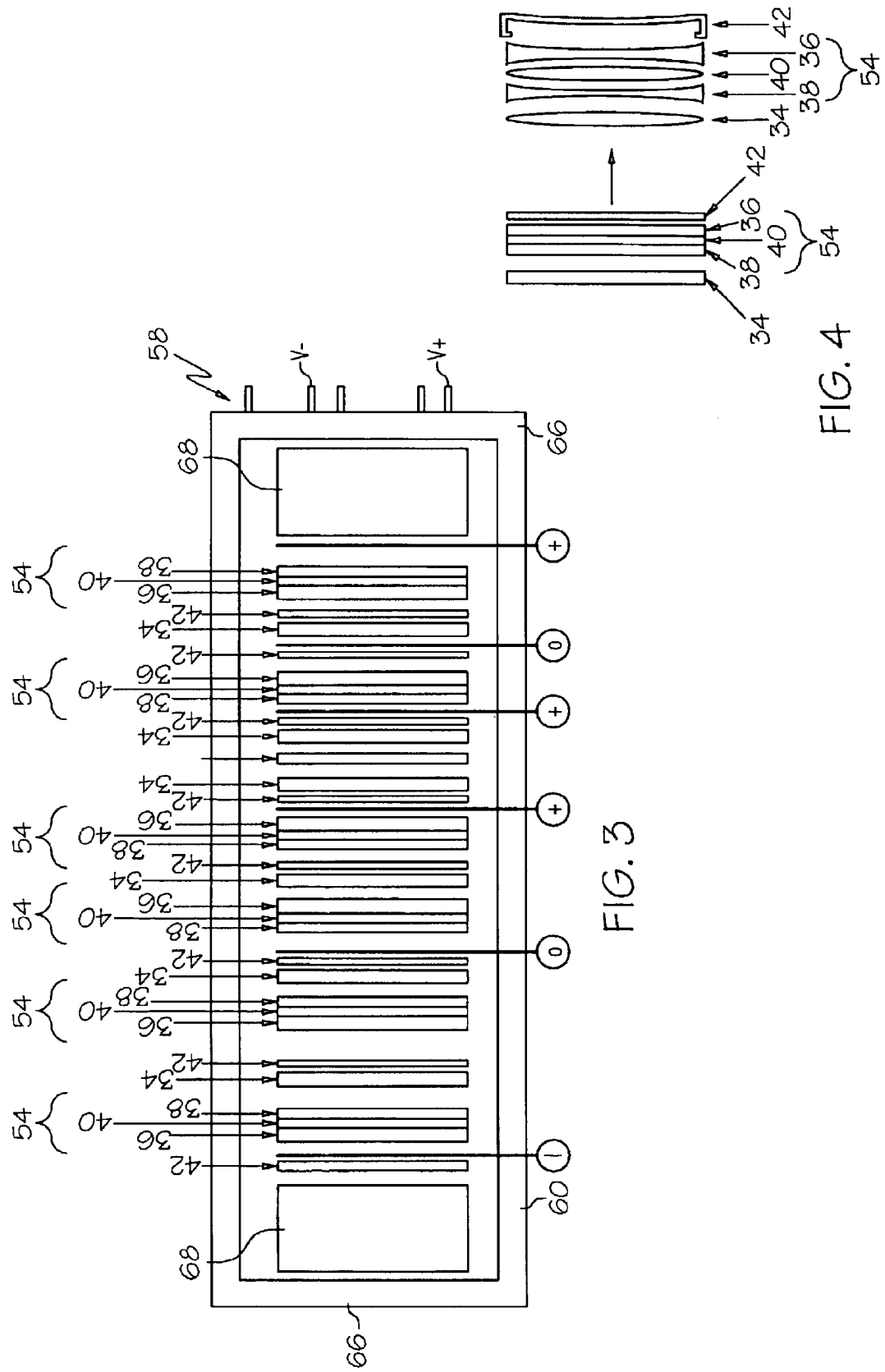

THERMAL BATTERY

BACKGROUND OF THE INVENTION

Thermal batteries are designed for immediate and short-duration activation under extreme operating conditions. In an inert state suitable for storage, a thermal battery is dormant, and can remain inactive for long periods of time. Upon initiation, a thermal battery instantly activates to serve as an accurate voltage source that is stable for a predetermined time duration.

Contemporary thermal batteries include an anode and cathode separated by a solid electrolyte. In a solid state, the electrolyte is dormant, and serves as an electrical buffer between the anode and cathode. When converted to a molten state, for example by means of heat produced by an activated pyrotechnic charge, the electrolyte becomes a conductor, serving as a conduit between the anode and cathode. The thermal battery remains active for a predetermined period of time until the charge is exhausted.

Examples of thermal batteries are disclosed in U.S. Pat. Nos. 5,895,730 and 6,198,249, the contents of which are incorporated herein by reference. Such thermal batteries are limited in their operation in that they suffer from relatively low energy density, short-duration activation period, limited shelf life in storage, poor reliability under exposure to extreme acceleration, large size and weight, limited altitude operation range, and narrow temperature operation range.

SUMMARY OF THE INVENTION

The present invention is directed to a thermal battery and process for forming a thermal battery that overcome the limitations of conventional embodiments. In particular, the battery and method of the present invention are well suited for battery applications that require highly integrated thermal batteries that are relatively small in physical size, yet are capable of reliable performance over a wide range of operating conditions.

In one aspect, the thermal battery of the present invention is housed in a chamber that utilizes micro-electromechanical systems (MEMS)-based technology to offer superior chemical stability and advantageous mechanical and thermal properties. In another aspect, the thermal battery of the present invention is activated by heat, for example heat generated by a pyrotechnic charge, for immediate and thorough activation of the electrolyte. In another aspect, the anode, cathode and electrolyte may be formed of pellets having a curved interface for increased current density.

In another aspect of this invention, the pyrotechnic charge consists of a heating pellet including suitable chemical ingredients, which is utilized to provide rapid, controlled, high-temperature heating of the electrolyte to achieve rapid melting. In a preferred embodiment, the heating pellet consists essentially of thermite, a blended mixture of two solid components, iron (III) oxide and aluminum powder, that may be pressed and shaped as described hereinafter. Upon ignition, thermite produces a large quantity of heat (relative to the mass of the components) and two distinct solid-based byproducts (iron and aluminum oxide) with zero moles of gas. By "solid-based" it is meant that the byproduct is a solid at ambient conditions. (The thermite reaction may initially produce molten iron.)

Because all of the thermite reaction byproducts are solid-based, i.e., no gases are evolved, all of the evolved energy (847.6 kJ/mole of energy) is available for heating the solid eutectic carbonate electrolyte of this invention. When gases are evolved as byproducts of a chemical reaction, there is a variability in the reaction kinetics, i.e. turbulence, which creates oscillations in pressure and heat output. This variability, in the case of a thermal battery, leads to uncontrolled or erratic melting of the carbonate electrolyte and to possible inefficiencies and interruptions in the generation of electrical power. Such limitations are avoided in this aspect of the present invention by using a suitable material, e.g. thermite, as the primary heat source.

In another aspect of this invention, the thermite pyrotechnic charge is activated by means of an ignition strip that burns at a high enough temperature to ignite the thermite. In a preferred embodiment, the ignition strip includes a fuse roll or foil strip consisting essentially of about 54 wt. % magnesium powder, about 30 wt. % Teflon™, and about 16 wt. % Viton™ (hereinafter "MTV"). Teflon™ and Viton™ are materials available from E. I. DuPont de Nemours and Company, Wilmington, Del. An MTV ignition strip is preferred to a simple magnesium strip for purposes of this invention because it has been found that the heat output from combustion of the MTV strip is much higher and more controlled. Also, an MTV ignition strip can be easily processed into the sizes and shapes required for use with the thermal batteries of the present invention.

Alternatively, an ignition strip in accordance with the present invention may consist essentially of bisnitro cobalt-3-perchlorate (BNCP), which is synthesized according to known techniques.

In another aspect of this invention, the electrolyte is in the form of a thin, solid tablet or pellet at ambient conditions, and is positioned between the anode and cathode elements of a cell unit. A preferred electrolyte in accordance with the present invention includes a three-component blended eutectic salt mixture selected to have a melting temperature in the range of about 490° C.–520° C. In a particularly preferred embodiment, the electrolyte consists essentially of one of the following two ternary eutectic mixtures of alkali carbonate salts.

A first preferred eutectic carbonate salt mixture consists essentially of lithium carbonate ($Li_2CO_3$), sodium carbonate ($Na_2CO_3$), and potassium carbonate ($K_2CO_3$), hereinafter abbreviated as "$(LNk)_2CO_3$". In general, this mixture may include about 38–49 wt. % lithium carbonate, 26–37 wt. % sodium carbonate, and 20–30 wt. % potassium carbonate. For example, a preferred mixture of about 43.5 wt. % lithium carbonate, 31.5 wt. % sodium carbonate, and 25 wt. % potassium carbonate has been determined to have a eutectic melting point of 518° C., within the preferred electrolyte melting temperature range.

A second preferred eutectic carbonate salt mixture consists essentially of lithium carbonate ($Li_2CO_3$), sodium carbonate ($Na_2CO_3$), and rubidium carbonate ($Rb_2CO_3$), hereinafter abbreviated as "$(LNR)_2CO_3$". In general, this mixture may include about 34–44 wt. % lithium carbonate, 33–44 wt. % sodium carbonate, and 17–28 wt. % rubidium carbonate. For example, a preferred mixture of about 39 wt. % lithium carbonate, 38.5 wt. % sodium carbonate, and 22.5 wt. % rubidium carbonate has been determined to have a eutectic melting point of 499° C., also within the preferred electrolyte melting temperature range.

In accordance with the present invention, it has been found that a ternary eutectic salt mix achieves superior performance in thermal battery applications as compared with single or two-component mixtures. In particular, it has been found that the heat capacity of the ternary eutectic mix is much higher than that for a two component (carbonate or non-carbonate based) eutectic molten salt. This ensures that the molten electrolyte salt in the ternary composition remains as a liquid melt for a much longer time, thus leading to the longer operation life and markedly improved electronic transfer.

In another preferred embodiment of this invention, the electrolyte consists essentially of a ternary inorganic alkali carbonate eutectic salt composition blended with a minor proportion, e.g., about 0.005%–10% by weight, most preferably about 1% by weight, of a surfactant to enhance electron mobility during electrolyte activation and to improve wetting of the molten electrolyte to the internal walls of a zeolite molecular sieve as hereinafter described. A particularly preferred surfactant for such purposes is sodium lauryl sulfate.

In still another aspect of this invention, an anode element of a thermal battery according to the present invention includes an alkali/alkaline earth metal alloy shaped as a lozenge or pellet. In a preferred embodiment, the anode element consists essentially of 15–25 wt. % of lithium and 75–85 wt. %, preferably about 20 wt. % of germanium, preferably about 80 wt. % of germanium, pressed into thin foil of about 0.01–1.00 mm in thickness. In a further preferred embodiment, the anode foil is partially enclosed in a composite mixture consisting essentially of vanadium, metal carbonate salt electrolyte, and a zeolite composition bent or fabricated into the shape of a foil cup to act as a separator.

In still another aspect of this invention, a cathode element of a thermal battery according to the present invention includes a material having adequate electrical conductivity, structural integrity at the normal operating temperatures of the battery, and a low dissolution rate in molten carbonate, shaped as a lozenge or pellet. In a preferred embodiment, the cathode element(s) of the present invention consist essentially of vanadium pentoxide ($V_2O_5$) having at least some degree of porosity. Alternatively, vanadium trioxide ($V_2O_3$) or vanadium dioxide ($VO_2$) can be substituted for $V_2O_5$ as the cathode for some embodiments of the present invention. Upon activation of a thermal battery according to this invention, heat is evolved and expansion of the cathode occurs. The pores/voids within the cathode become larger. Furthermore, the interface between the anode and the cathode at the higher temperature may undergo some separation. To avoid possible resultant leakage of the molten electrolyte, another embodiment of the present invention provides for at least partially enclosing the cathode in a separator as described above for the anode.

In a preferred embodiment of this aspect of the present invention, the separator element contains sodium aluminosilicates materials generally known as zeolites. Zeolites act (due to their porous structure) as molecular traps for the molten electrolyte. Historically, zeolites were limited to crystalline, porous aluminosilicate compounds. Other porous materials have been found to perform as well as the classical zeolite compounds, such that the current definition of zeolite encompasses materials beyond aluminum and silicate, and includes other materials that have well-defined porous crystalline structures.

In another aspect of this invention, a separator element is positioned between the heat pellet and/or the electrolyte pellet and the anode and/or the cathode, or between adjacent cells in a cell stack, to prevent leakage of molten electrolyte during activation. In a preferred embodiment, the separator consists essentially of a composite of vanadium and a zeolite-type molecular sieve. The structures and uses of zeolites are generally described in "Zeolite Molecular Sieves," by Donald W. Breck (John Wiley and Sons 1974), which text is incorporated herein by reference. A preferred zeolite in accordance with the present invention is zeolite CBV-100™, a sodium aluminosilicate type zeolite. CVB-100™ is a zeolite product available from Zeolyst International, Valley Forge, Pa. Other selected zeolites, and certain types of porous clays, such as montmorillonite clays, may be substituted for zeolite CBV-100™ for particular applications. Useful clays must possess ion exchange characteristics as well as being able to act as molecular traps. The composite mix may be fabricated (pressed) into a thin, compacted foil, and the foil can be bent into a shallow cup-like shape. The presence of a small proportion of a surfactant, such as sodium lauryl sulfate, in the electrolyte as previously described improves the wetting of the molten electrolyte to the internal walls of the zeolite voids within the vanadium-zeolite composite separator element and thus helps to immobilize the molten electrolyte. While vanadium is mentioned as a preferred component of the separator element, other substances, such as the platinum-group metals and their alloys, refractory metals and their alloys, and the vanadium family (including vanadium, tantalum, and niobium) and their alloys, are equally applicable as components of the separator element of the present invention.

In still another embodiment of this invention, solid electrolyte may be incorporated into the composite mix which is then fabricated into a thin, compacted foil separator element. Mixing of the two or three components used in fabricating a separator element in accordance with the present invention may be accomplished by many means depending on the size of the batch. As mixing may be accomplished in a dry state, the most appropriate methods of mixing the separator materials include using a ball mill, a V-Shell Blender, or a ribbon blender. The most appropriate is a ball milling operation. Mixing is conducted on dry basis for a period of 30–45 minutes, using 0.25–5 inch diameter rubber balls. Mixing is accomplished by rolling a ceramic jar mill on a roller mill, with the mix and balls. This ensures intimate mixing of the materials. Once the mix is homogeneous, it is compacted into a thin casing (cup-like) foil around the anode.

For this embodiment of the invention, the relative proportions (by weight) of the three components may range from about 59–79% vanadium, 1–21% zeolite, and 10–30% electrolyte. A preferred mixture includes 75 wt. % vanadium, 17 wt. % zeolite, and 8 wt. % electrolyte. When such a vanadium/zeolite/electrolyte composite foil cup at least partially encloses the lithium-germanium alloy anode, for example, it provides added protection against migration of any free molten lithium, which could short out the circuit, as well as serving as an electron collectors. In a preferred embodiment of this aspect of the invention, the zeolite is zeolite CBV-100, a sodium aluminosilicate type zeolite, which is mixed with the solid electrolyte component in a ratio of about 7.5 parts by weight vanadium/1.7 parts by weight zeolite/0.8 parts by weight solid electrolyte. Other selected zeolites, and certain types of porous clays, such as montmorillonite clays, may be substituted for zeolite CBV-100 for particular applications. Useful clays must possess ion exchange characteristics as well as being able to act as molecular traps.

In an overall preferred embodiment, a thermal battery according to the present invention may include lithium/germanium alloy as the anode, vanadium pentoxide as the cathode, a ternary eutectic carbonate salt mix as the electrolyte, and with a vanadium metal-zeolite composite separator positioned between the heat pellet and the anode and/or cathode. In this preferred embodiment, the heat pellet is thermite. An MTV fuse roll surrounds the perimeter of the battery and contacts the thermite. The fuse roll igniter is a high precision micro-electromechanical system (MEMS) microcapillary initiator in accordance with this invention or, alternatively, a microelectric match.

A vent may be included on the battery housing to release pressure that accumulates beyond a predetermined level in the housing.

In another aspect, the present invention is directed to a thermal battery including: an anode, a cathode, and an electrolyte between the anode and cathode. The electrolyte has a first inactive state in which the electrolyte is electrically insulative, and has a second active state in which the electrolyte is electrically conductive between the anode and cathode. A heat element transforms the electrolyte from the first inactive state to the second active state.

In one embodiment, the first interface between the electrolyte and at least one of the anode and cathode is non-planar, for example, semi-spherical, elliptical, parabolic, or faceted in shape. A second interface between the electrolyte and the other of the anode and cathode is also non-planar, for example semi-spherical, elliptical, parabolic, or faceted in shape. The heat element is adjacent one of the anode and cathode and a third interface of the heat element and the one of the anode and cathode is non-planar. A second heat element adjacent the other of the anode and cathode and a fourth interface of the second heat element and the other of the anode and cathode is non-planar. The third and fourth interfaces are preferably semi-spherical, elliptical, parabolic, or faceted in shape.

The electrolyte is, for example, solid in the first inactive state and liquid in the second active state, and the heat element provides heat for transforming the electrolyte from the first inactive state to the second active state.

In another embodiment, a separator element may be included for preventing the flow of electrolyte in the second active state. In one example the separator element encompasses a base portion and side walls of the anode. The separator element may also include extension arms that extend beyond the side walls of the anode to ensure mechanical separation of the anode and cathode when the electrolyte is in the first inactive state.

In another embodiment, the separator element is positioned between two other components of said thermal battery, for example positioned between the electrolyte and the anode or the cathode, or positioned between the heat element and the anode or the cathode.

In another embodiment, the thermal battery is housed in a housing including a silicon-carbide (SiC) treated substrate, for example a silicon substrate or a silicon substrate treated with $SiO_2$ prior to the SiC treatment. The housing is preferably hermetically sealed, and may include a microvent to release pressure that builds within the housing beyond a predetermined level.

In one embodiment, the housing includes a cavity etched in the substrate, within which the anode, cathode, electrolyte and heat element are deposited. Multiple cavities may be etched in the substrate, within which multiple unit cells, each unit cell including an anode, cathode, electrolyte and heat element, are deposited. Multiple unit cells may be stacked within the housing, each unit cell including an anode, cathode, electrolyte. IN this case adjacent unit cells in the stack may share a common heat element.

A pyrotechnic initiator may be employed for activating the heat element, and the heat element may include a pyrotechnic charge. The pyrotechnic charge may include a mixture of chemical components which produces an exothermic reaction upon being heated to ignition temperature, said exothermic reaction producing only reaction byproducts which are solids at ambient conditions, for example thermite.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a cross-sectional view of a second multiple-cell thermal battery module configuration in accordance with the present invention.

FIG. 4 is a side exploded view of one of the cells of the thermal battery of FIG. 4, in accordance with the present invention.

DETAILED DESCRIPTION OF PREFERRED EMBODIMENTS

Figure 1:
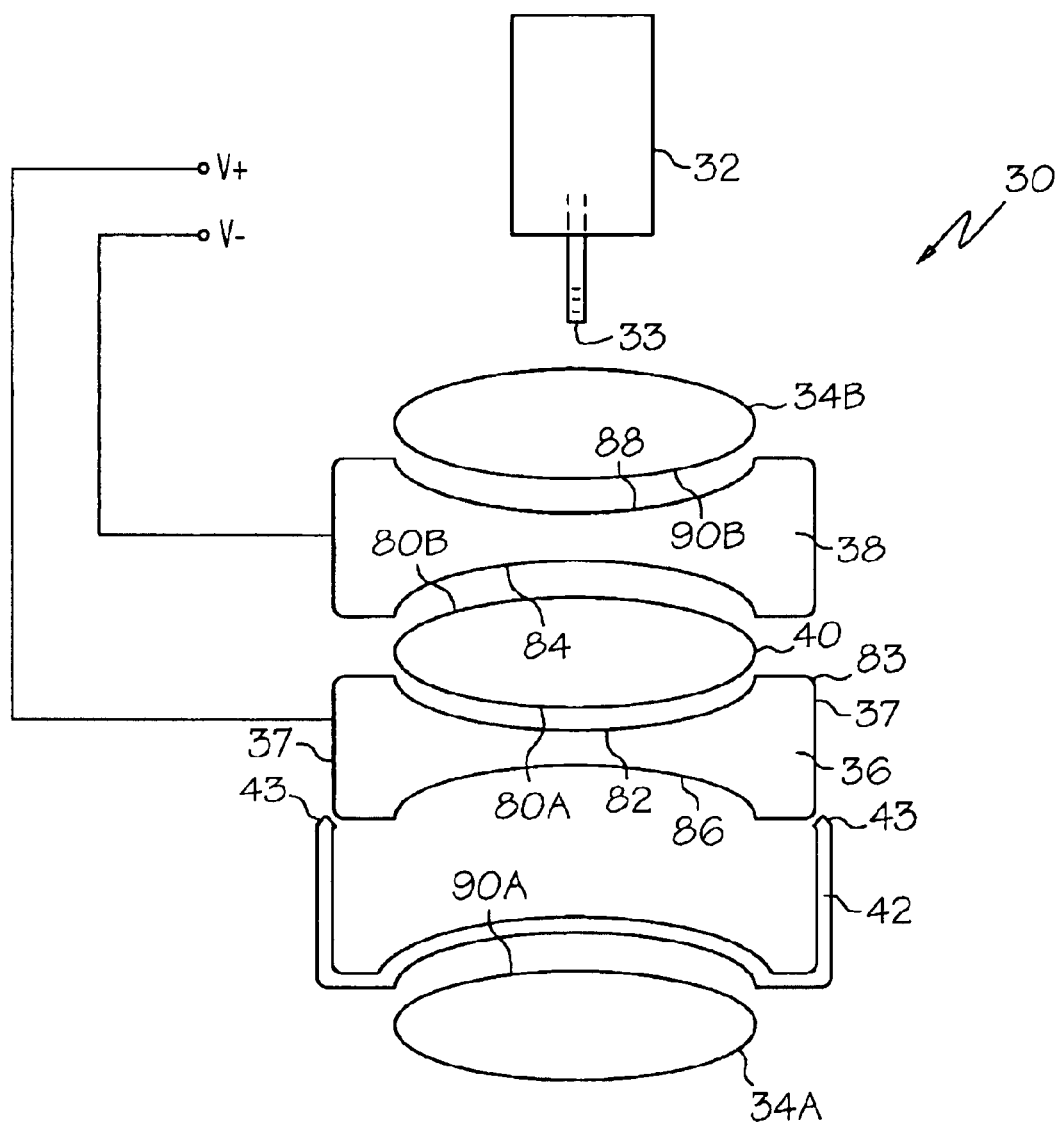
FIG. 1 is a conceptual exploded side view of a thermal battery configuration in accordance with the present invention.

FIG. 1 is an exploded side conceptual view of a thermal battery cell configuration in accordance with the present invention. A thermal battery cell 30 includes an anode 36 and a cathode 38 separated by a solid electrolyte 40. A first heat pellet 34A is disposed adjacent the anode 36 opposite the electrolyte 40 and a second heat pellet 34B is disposed adjacent the cathode 38 opposite the electrolyte 40. In one embodiment, the anode 36 comprises a Lithium/Germanium (Li/Ge) alloy, the cathode 38 comprises Vanadium Pentoxide ($V_2O_5$), and the electrolyte 40 comprises a ternary eutectic carbonate salt mix, as described on further detail below.

While in a dormant state, the electrolyte 40 is solid and non-conductive, and serves as an insulator, or buffer, between the anode 36 and cathode 38. The thermal battery can be stored for an extended period of time in this dormant state. When the electrolyte 40 becomes active, that is, transformed into a molten state, the molten electrolyte 40 operates as a conductor, and current is conducted between the anode 36 and cathode 38, thereby providing an output voltage potential between the positive voltage terminal V+ and the negative voltage terminal V−.

The thermal battery cell 30 can be activated by a heat source, for example a pyrotechnic initiator 32. The pyrotechnic initiator 32 generates a controlled flame at an outlet 33 that is incident on the first and/or second heat pellets 34A, 34B, initiating combustion of the heat pellets 34A, 34B at a controlled temperature. In one embodiment, the heat pellets 34A, 34B comprise a thermite mix, which reacts at a controlled high temperature sufficient for transforming the electrolyte 40 to a molten state. This embodiment is described in further detail below.

A separator 42 may be included to confine the molten electrolyte 40 to a cell reaction region between the anode and cathode of the battery cell 30. The separator 42 serves as a barrier to the molten electrolyte 40, in order to prevent the electrolyte from escaping the cell reaction region. In a multiple-cell configuration, as discussed in detail below, the separator additionally prevents molten electrolyte 40 of one cell unit from flowing into an adjacent cell unit. In a preferred embodiment, the separator 42 comprises a thin sheet of metal, for example a steel strip, folded about the side walls 37 and external surface 86 of the anode 36. The separator may also optionally be formed about the cathode 38. The separator 42 is preferably isolated from direct contact with the electrolyte 40. In one embodiment, the separator 42 is formed of a Vanadium composition, that may optionally include a porous material such as zeolyte to serve as a molecular trap for any molten electrolyte that may escape the reaction region between the anode 36 and cathode 38.

The separator 42 is preferably formed in a cup shape as to encompass the side walls 37 and external surface 86 of the anode 36. The walls of the cup preferably include upper extension arms 43 that extend beyond the top surface 83 of the anode 36, to serve as an electrical insulator between the anode 36 and cathode 38, and to prevent direct physical contact between the anode 36 and cathode 38 when the electrolyte 40 is in a solid, dormant state.

The structures and uses of common zeolites are generally described in "Zeolite Molecular Sieves," by Donald W. Breck (John Wiley and Sons 1974), which text is incorporated herein by reference. A preferred zeolite in accordance with the present invention is zeolite CBV-100, a sodium aluminosilicate type zeolite. As previously discussed, other selected zeolites, and certain types of porous clays, such as montmorillonite clays, maybe substituted for zeolite CBV-100 for particular applications. Useful clays must possess ion exchange characteristics as well as being able to act as molecular traps.

In one embodiment, the electrolyte 40 is formed to have a first convex surface 80A that interfaces with a mating concave inner surface 82 of the anode 36. Similarly, the electrolyte also includes a second convex surface 80B that interfaces with a mating concave inner surface 84 of the cathode. This configuration is especially applicable for highly-integrated applications of the present invention, since the effective area of the interface between the electrolyte 40 and anode 36, and the electrolyte 40 and cathode 36 is increased. This, in turn, increases the resulting current density and the overall power output of the battery. The curved interface can have an elliptical, parabolic, circular, semi-circular, or faceted cross-section, depending on the application. In a preferred embodiment, the interface is semi-spherical in shape, having a semi-circular cross-section. The anode 36, cathode 38, electrolyte 40, and heat pellet 34 may be formed in various mating shapes, preferably with non-planar interfaces, so as to increase the effective surface area of the region of interaction between the components.

Similarly, the outer surface 86 of the anode 36 and the outer surface 88 of the cathode 38 are concave and respectively mate with convex outer surfaces 90A, 90B of the heat pellets 34A, 34B. The curved interface improves increases the heat density, or heat flux, between the heat pellets 34A, 34B, 34C and the electrolyte 40, via the anode 36A, 36B or cathode 38A, 38B.

In the above examples, the respective concavities of the electrolyte, anode, cathode and heat pellets, may be reversed, depending on the application.

Figure 2:
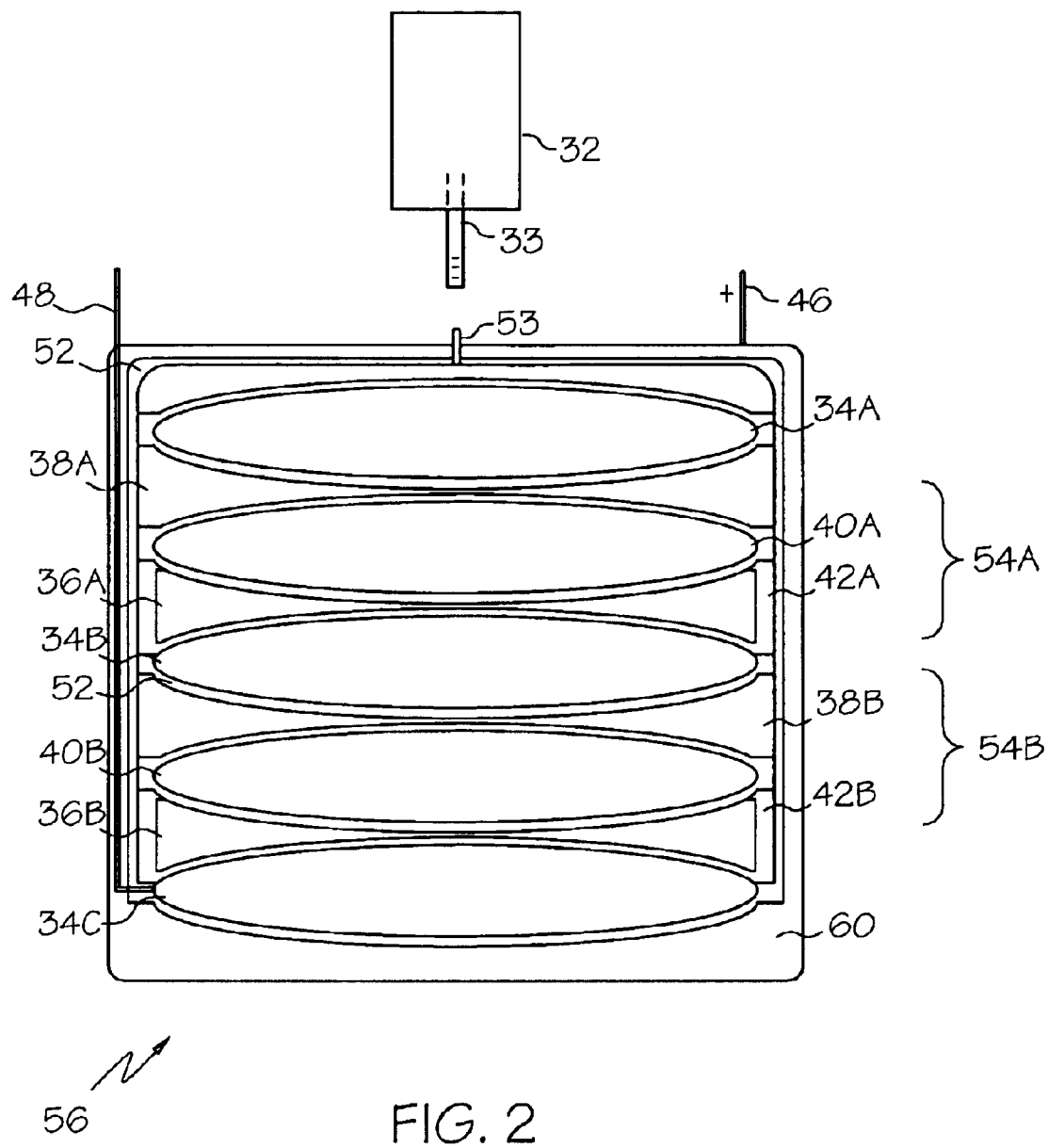
FIG. 2 is a cross-sectional view of a first multiple-cell thermal battery module configuration in accordance with the present invention.

With reference to FIG. 2, an embodiment of a thermal battery in accordance with the present invention may include multiple cell units 54A, 54B staked on top of each other within a single cell enclosure, or module 56. Each cell unit 54A, 54B in the module includes a corresponding anode 36A, 36B, cathode 38A, 38B, and electrolyte 40A, 40B. First, second and third heat pellets 34A, 34B, 34C are positioned adjacent the anodes 36A, 36B and cathodes 38A, 38B, opposite the electrolytes 40A, 40B, as shown. First and second separators 42A, 42B are positioned between the first and second anodes 36A, 36B and the second and third heat pellets 34B, 34C respectively, as shown.

Optionally surrounding the perimeter of the stacked battery cells 54A, 54B and heat pellets 34A, 34B, 34C is an ignition strip 52, for example comprising a composition consisting essentially of magnesium, Teflon™, and Viton™ (MTV). The ignition strip 52, in the form of a sheet or roll, is placed in contact with the thermite heat pellets 34A, 34B, 34C. The ignition strip 52 composition, upon ignition, for example by initiator 32, for example at initiation tab 53, ensures instantaneous ignition of the thermite heat pellets 34A, 34B, 34C.

In a preferred embodiment, the ignition strip 52 in accordance with the present invention comprises a fuse roll or foil strip consisting essentially of about 54 wt. % magnesium powder, about 30 wt. % Teflon™, and about 16 wt. % Viton™ ("MTV"). An MTV ignition strip is preferred to a simple magnesium strip for purposes of this invention because it has been found that the heat output from combustion of the MTV strip is much higher and more controlled. Also, an MTV ignition strip can be easily processed into the sizes and shapes required for use with the thermal batteries of the present invention. Alternatively, an ignition strip in accordance with the present invention may consist essentially of bisnitro cobalt-3-perchlorate (BNCP), which is synthesized according to known techniques.

The battery module 56, including cell stack 54A, 54B, heat pellets 34A, 34B, 34C and ignition strip 52 are preferably encased in an insulative housing 60 formed, for example of poly-silicon. The housing 60 preferably comprises a silicon carbide (SiC)-treated silicon substrate, known to provide superior insulative properties. In one embodiment, the body of the housing 60 is formed of a silicon-based wafer substrate that is etched to form a cavity. The inner and outer surfaces of the cavity are treated with a SiC coating. The battery cells 54A, 54B and related components are housed within the cavity. Example formation techniques and advantages of silicon carbide-based materials are discussed in further detail below. The term "treatment", as used in the present specification, refers to any of a number of techniques for applying silicon carbide (or $SiO_2$ material) to the substrate, which techniques include, for example, coating, layering, impregnating, sputtering, and deposition.

The initiator 32 may comprise, for example an initiator as disclosed in U.S. patent application Ser. No. 09/981,038 filed Oct. 17, 2001; and U.S. patent application Ser. No. 10,121,473, entitled "Constant-output high-precision microcapillary pyrotechnic initiator", by Sami Daoud. filed of even date herewith; the contents of each being incorporated herein by reference. The pyrotechnic initiators disclosed in the referenced patent applications are hermetically sealed electro-explosive devices generally characterized by their compactness, light weight, environmental resistance, and high reliability. Contained within the initiator housing is a squib assembly. The squib assembly comprises a squib internal housing, a header body and a pyrotechnic charge. Two pin connectors protrude through the header assembly and are encased by a glass-to-metal seal, hermetically sealing the squib assembly within the initiator housing. The pin connectors are electrically connected to a dual-bridge wire that is buried within the pyrotechnic charge. When current is applied to the connectors, the bridgewire is electrically heated, causing the pyrotechnic charge to initiate, and a controlled burn of the charge produces a flame at the outlet 33.

When an activation signal is transmitted to the initiator 32, the initiator 32 is activated and ignites the ignition strip tab 53. Ignition proceeds from the tab 53 along the path of the ignition strip 52 within the module 56. The heat energy from the ignition strip 52 in turn ignites the heat pellets 34A, 34B, 34C, which generate heat for initiating melting of the electrolyte units 40A, 40B. Upon melting, the electrolyte units 40A, 40B become conductive, and electrons begin to flow from cathode 38A to anode 36A and from cathode 38B to the anodes 36A, which leads to generation of a voltage potential at the positive 46 and negative 48 voltage terminals. The respective anodes and cathodes within a module may be electrically coupled in parallel, or in series, depending on the voltage and power requirements of the application. Initiation time is nearly instantaneous, for example within 10–40 microseconds. Activation time varies, depending on the application and size of the battery. In the example provided in the present specification, activation time ranging from seconds to beyond 45 minutes is possible.

With reference to FIGS. 3 and 4, many cell units 54 may be stacked adjacent each other in a battery module housing 60. As described above, the housing 60 is preferably formed of a thermally insulative material, for example a silicon carbide-treated silicon substrate, as mentioned above, and discussed in further detail below. Additional insulation 68, for example an additional deposit of thermally insulative SiC material, is provided in the top and bottom regions of the stack. Top and/or bottom lids 66 are likewise formed of thermally insulative material, for example a silicon substrate treated with silicon carbide. As shown in FIG. 4, each cell 54 in the stack comprises a heat pellet 34, cathode 38, electrolyte pellet 40, anode 36 and separator 42. The right side of the FIG. 4 diagram illustrates an exaggerated view of the curved geometry of the cell components. Each unit cell 54 is capable of a predetermined power output, and the multiple unit cells 54, in combination, provide a power output that is representative of a multiple of the capacity of each individual cell 54.

The thermal battery of the present invention including the components as stated above can be referred to as a Lithium-Germanium/Vanadium Pentoxide Cell, or Li—Ge/$V_2O_5$. The overall cell composition may be referred to as Li—Ge/$(LNK)_2CO_3/V_2O_5$. The system and chemistry is illustrated as follows:

| System | Anode | Cathode | Electrolyte | Separator |
|---|---|---|---|---|
| Li—Ge//$V_2O_5$ | Li—Ge | $V_2O_5$ | $(LNK)_2CO_3$ or $(LNR)_2CO_3$ | Vanadium |

At activation, the cell reaction is as follows:

$$LiGe + V_2O_5 \leftrightharpoons Li_xV_2O_5 + Li_{1-x}Ge$$

The process of fabricating the thin electrolyte tablet 40 involves pressing a mixture of modified LNK carbonate or LNR carbonate, preferably containing 1% Sodium Lauryl Sulfate (SLS), using a multi-station tablet press, to a density $\geq 98\%$ of the theoretical maximum density (TMD). The eutectic mixture is blended in an appropriate container, for example a V-Shell blender, Ribbon blender, Tribula mixer, a ball mill, or otherwise, along with the SLS, for 30 minutes. The blend is then pressed into thin tablets using a multi-station tablet press. The electrolyte tablet 40 is formed in a bi-convex shape, for example, in the shape of an oblate spheroid which is seated between the mating concave cavities of the anode/cathode lozenge-type tablets. In alternative embodiments, the concavity can be reversed such that the upper and lower surfaces of the electrolyte 40 are concave, and such that the adjacent surfaces of the anode 36 and cathode 38 are convex. However, if the concavity is reversed, then additional measures should be taken to prevent the molten electrolyte from leaking out of the reaction region. The terms lozenge, tablet and pellet, as used in connection with the shape of the anode, cathode, electrolyte and heat element, refer generally to both the biconvex shape of the electrolyte and heat pellet depicted in the figures, as well as the biconcave shape of the anode and cathode. As indicated above, the shape and concavities may be reversed. It is preferred that the various interfaces between the mating components are in continuous contact.

The thermite heat pellets 34 are processed in the same manner as the electrolyte units 40, and the anode 36 and cathode 38 lozenge-style tablets are manufactured using similar tooling in the multi-station tablet press.

Figure 5:
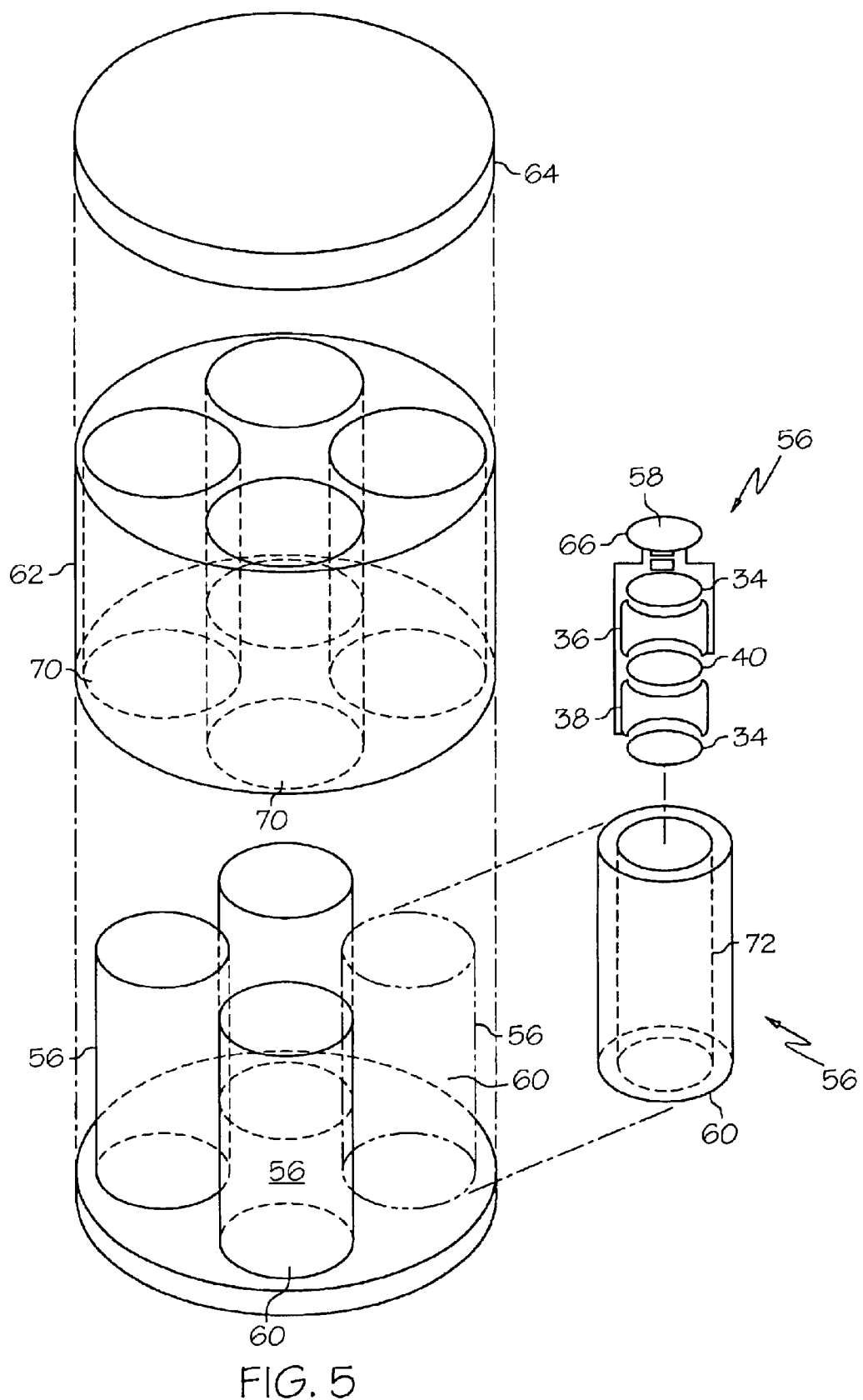
FIG. 5 is an exploded perspective view of a multiple module battery enclosure, in accordance with the present invention.

With reference to FIG. 5, construction of the proposed thermal battery makes use of the Chemical Vapor Deposition (CVD) technology mentioned above, and described in detail below, in order to fabricate structural components. In one embodiment, a battery enclosure 62 serves as a housing for multiple cell modules 56, which may operate together, or independently, to provide a singular, or multiple power outputs. Like the cell modules 56, the battery enclosure 62 may likewise be formed of a silicon substrate. In this embodiment, a plurality of cylindrical holes or compartments 70 are etched in the substrate. Each cylindrical hole 70 is adapted to receive a cell module 56, for example a cell module as shown in FIGS. 2 and 3. Following formation of the battery enclosure 62 geometry, a thin film of silicon oxide ($SiO_2$) is deposited on the external surface and the internal surface of each compartment. Following this, chemical vapor deposition of silicon carbide (SiC) is performed on the resulting structure to provide a thin layer of SiC on exposed surfaces to provide the battery enclosure 62 with superior insulative properties. Alternatively, the SiC layer may be deposited directly on the internal and external surfaces of the battery enclosure 62.

Battery modules 56 are likewise prepared and inserted in the compartments of the treated battery enclosure 62. Each of the battery modules 56, or stacks, is itself encased in a silicon-carbide-treated enclosure 60 formed of a silicon substrate, as described above. Cylindrical module compartments 72 are etched in the substrate, and the substrate is treated with $SiO_2$ and SiC, as described briefly above, and in detail below. Alternatively, the SiC layer may be deposited directly on the internal and external surfaces of the battery enclosure 62. The battery components, including for example, heat pellets 34, anode 36, cathode 38, and electrolyte 40, are positioned in the cylindrical compartment 72. A battery module lid 66 is formed in the shape of a disk and hermetically sealed to the module body 60. Apertures may be formed in the battery module lid 66 for access by the initiator, electrodes, and a pressure vent valve 58.

Figure 6:
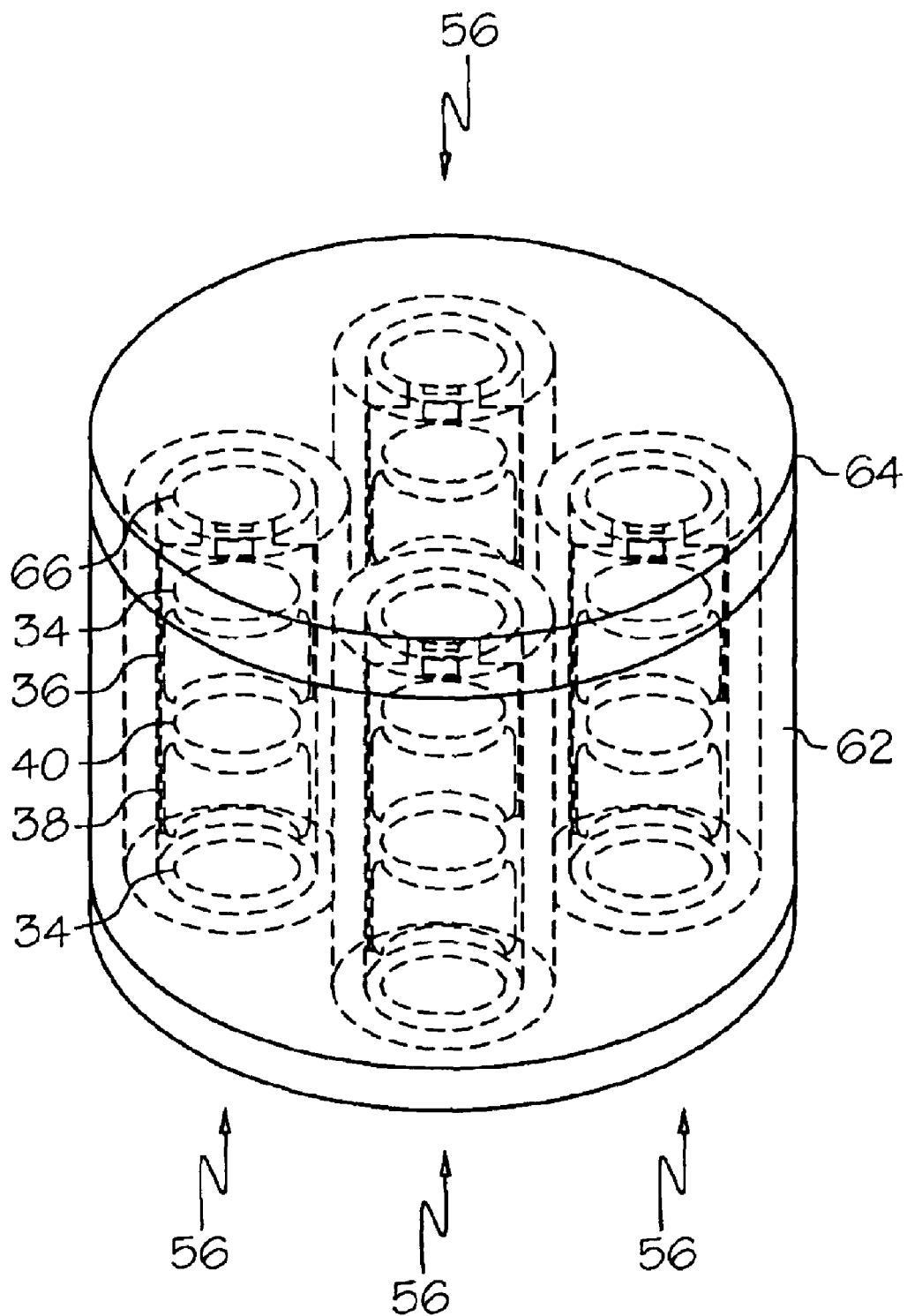
FIG. 6 is an assembled perspective view of the multiple module battery enclosure, in accordance with the present invention.

Following placement of the battery modules 56 into the enclosure compartments 70, a battery enclosure lid 64 is applied and hermetically sealed to the enclosure body 62. The completed battery enclosure is shown in FIG. 6. This configuration includes a number of cell modules 56, each for example comprising cell stacks, as described above. The modules are electrically and thermally isolated from each other by the body of the battery enclosure 62; however, the electrical outputs of the cell modules 56 may be coupled together to provide a collective power source that consists of all, or some of the cell modules 56.

The completed battery assembly is hermetically sealed and consists of a series array, or series-parallel array, of cells. The assembly described above is cylindrical in shape, however, other geometric shapes are equally applicable. An overall length-to-diameter (L/D) ratio of 1–1.1 is preferred, since this geometry tends to minimize heat loss. The interior of the enclosure 62 is preferably pressurized with nitrogen to a pressure ranging between 0.1 to 1.5 psig. Once activated, the post-activation operation time ranges in duration, depending on the application.

In the configuration described above, the internal operating temperature can be relatively high, for example 650° C. This is due to the utilization of thermite as a high calorific output pyrotechnic. This higher operating temperature is necessary for melting the ternary eutectic electrolyte, and provides an opportunity for achieving higher overall system efficiency, and greater flexibility in the use of high-performance fuels.

Once the battery is activated, dependence of aggregate cell voltage potentials on pressure within the hermetically sealed battery enclosure may be observed. For a change in pressure from $P_1$ to $P_2$, the change in potential ($\Delta V_p$) is:

$$\Delta V_p = RT/2 \, F \, \ln[P_{1,a}/P_{2,a}] + RT/2 \, F \, \ln[P_{2,c}/P_{1,c}]^{3/2}$$

where the subscripts a and c refer to the anode and cathode, respectively. In the embodiment of the present invention, where the anode and cathode are at the same pressure, i.e., $P_1 = P_{1,a} = P_{1,c}$ $$\Delta V_p = RT/2\ F\ \ln[P_1/P_2] + RT/2F\ \ln[P_2/P_1]^{3/2} = RT/4\ F\ \ln[P_2/P_1]$$

Therefore, at 650° C., $$\Delta V_p\ (mV) = 20\ \ln\ P_2//P_1 = 46\ \log\ P_2/P_1$$

In essence, a tenfold increase in cell pressure corresponds to an increase of 46 mV in the battery potential at 650° C. Therefore, an increase in the aggregate cell (battery) operating pressure results in enhanced battery voltage due to increased partial pressure of the reactants, and increased mass transport rates.

In order to mitigate the effects of increased pressure in the battery enclosure, a microvent valve 58 (see FIG. 5) is fabricated on the header surface. The valve ensures that the internal pressure of thermal battery does not exceed a predetermined margin, thus preventing damage to internal battery parts or contact points, and preventing variation in the battery potential. The valve essentially consists of a fluid diode, where channel patterns are used to minimize flow resistance in the forward direction, while creating interference in the reverse direction. In one example, a platinum layer is deposited by CVD on a silicon membrane over a vent orifice. When the platinum layer is heated, for example by the buildup of pressure internal to the battery housing, the platinum bends and the vent orifice is opened to release the buildup of internal pressure.

The voltage and current output of the thermal battery may be altered by varying the number of cells 54 or cell modules 56 and by varying the cell area. For example, each cell 54 may produce a voltage that varies from 1.6 to 3.3 volts, depending on the electrochemical system employed, and depending on the current density. The effective surface area can be varied by changing either the individual cell plate size or by electrically connecting cells in parallel. Adjusting the amount of material in a given cell can vary the ampere-hour capacity of the cell. Multiple voltage outputs can be realized by connecting the required number of cells in series. The resulting output voltage is typically a multiple of the voltage produced by the discrete cells. Multiple voltage outputs can be drawn either from a common group of cells or from an isolated group of cells. In the case where cells are electrically isolated, it is preferred that transient voltages (cross talk) between cells is eliminated.

In one embodiment of the present invention, the heat pellet(s) 34A, 34B and 34C are formed of thermite, a blended mixture of iron (III) oxide ($Fe_2O_3$) and aluminum powder in a proportion of about 8 parts by weight $Fe_2O_3$ to 3 parts by weight Al powder. In a preferred embodiment, as previously discussed, the thermite mixture is pressed and shaped into a lozenge-shaped tablet and wrapped in a thin MTV (magnesium-Teflon™-Viton™) foil composition. The MTV foil strip is used as a heat source ignition strip that ignites the thermite and initiates the thermite reaction.

In one embodiment of the present invention, the electrolyte 40 is in the form of a thin, solid tablet at ambient conditions, and is positioned between the anode and cathode elements of a cell unit. The electrolyte 40 is nonconductive when in a solid state, for example at ambient temperature and pressure. The pyrotechnic heat pellet(s) 34A, 34B, and 34C, upon ignition supply sufficient heat to instantaneously melt the solid electrolyte 40, in which state the electrolyte becomes conductive.

A preferred electrolyte in accordance with the present invention comprises a blended eutectic salt mixture selected to have a melting temperature in the range of about 490° C.–520° C. In a particularly preferred embodiment, the electrolyte consists essentially of one of the following two ternary eutectic mixtures of alkali carbonate salts.

A first preferred eutectic carbonate salt mixture consists essentially of lithium carbonate ($Li_2CO_3$), sodium carbonate ($Na_2CO_3$), and potassium carbonate ($K_2CO_3$), hereinafter abbreviated as "$(LNK)_2CO_3$". In general, this mixture may comprise about 38–49 wt. % lithium carbonate, 26–37 wt. % sodium carbonate, and 20–30 wt. % potassium carbonate. For example, a preferred mixture of about 43.5 wt. % lithium carbonate, 31.5 wt. % sodium carbonate, and 25 wt. % potassium carbonate has been determined to have a eutectic melting point of 518° C., within the preferred electrolyte melting temperature range.

A second preferred eutectic carbonate salt mixture consists essentially of lithium carbonate ($Li_2CO_3$), sodium carbonate ($Na_2CO_3$), and rubidium carbonate ($Rb_2CO_3$), hereinafter abbreviated as "$(LNR)_2CO_3$". In general, this mixture may comprise about 34–44 wt. % lithium carbonate, 33–44 wt. % sodium carbonate, and 17–28 wt. % rubidium carbonate. For example, a preferred mixture of about 39 wt. % lithium carbonate, 38.5 wt. % sodium carbonate, and 22.5 wt. % rubidium carbonate has been determined to have a eutectic melting point of 499° C., also within the preferred electrolyte melting temperature range.

In accordance with the present invention, it has been found that a ternary eutectic salt mixture performs surprisingly better as an electrolyte in thermal battery applications as compared with a single or even a two-component electrolyte. In particular, it has been determined that the heat capacity of the ternary eutectic mix is much higher than that for a two-component (carbonate or non-carbonate based) eutectic molten salt. This ensures that the molten electrolyte salt in the ternary mixture remains as a liquid melt for a much longer time, thus leading to longer operation life and electronic transfer.

In another preferred embodiment of this invention, the electrolyte 40 consists essentially of a ternary inorganic alkali carbonate eutectic salt composition blended with a minor proportion, e.g., about 0.005%–10% by weight, more preferably about 1% by weight, of a surfactant to enhance electron mobility during electrolyte activation and to improve wetting of the molten electrolyte to the internal walls of a zeolite molecular sieve as hereinafter described. A particularly preferred surfactant for such purposes is sodium lauryl sulfate. The surfactant is added to the salt during the manufacture (mixing of the dry salts) of the electrolyte pellets. Sodium lauryl sulfate surfactant (or any other surfactant compatible with the salts) enhances wetting by means of reducing surface tension of the cathode/anode interfaces. Reduction in surface tension increases wetting thus enhancing electronic transfer from the cathode to the anode through the molten electrolyte.

In one embodiment of this invention, an anode element 36 of a thermal battery according to the present invention comprises an alkali/alkaline earth metal alloy shaped as a lozenge or pellet. In a preferred embodiment, the anode element consists essentially of 15–25 wt. % of lithium and 75–85 wt. % of germanium, preferably about 20 wt. % of lithium and about 80 wt. % of germanium, pressed into thin foil of about 0.01–1.00 mm in thickness. In a further preferred embodiment, the anode foil is least partially enclosed in a composite mixture consisting essentially of vanadium, metal carbonate salt electrolyte, and a zeolite composition bent or fabricated into the shape of a foil cup to act as a separator and electron collector. At the same time, the foil cup provides added protection against migration of any free molten lithium, which can short the circuit.

In one embodiment of this invention, a cathode element 38 of a thermal battery according to the present invention comprises a material having adequate electrical conductivity, structural integrity, and a low dissolution rate in molten carbonate to avoid precipitation of the metal in the electrolyte structure, shaped as a lozenge or pellet. In a preferred embodiment, the cathode element consists essentially of vanadium pentoxide ($V_2O_5$) having at least some degree of porosity. Alternatively, vanadium trioxide ($V_2O_3$) or vanadium dioxide ($VO_2$) can be substituted for $V_2O_5$ as the cathode for some embodiments of the present invention.

The ignition strip 52 may comprise, for example, Magnesium-Teflon™-Viton™ (MTV). MTV is formulated as a composition, for example with 54% Magnesium powder, 30% Teflon™, and 16% Viton™. The processed material may be extruded into a thin rod geometry, and inserted in the center of each cell compartment. MTV can also be fabricated in a strip form, and/or cast in a sheet or roll geometry. When ignited, MTV generates a flame temperature of 2650° K., with a heat of explosion equivalent to 1540 cal./gram. This calorific output is more than sufficient to initiate a thermite heat pellet. Upon activation, for example by means of the initiator 32 (see FIGS. 1 and 2), as described above, the MTV ignition strip 52 ignites, and the ignition propagates through channels about the cells in the stack, causing instantaneous ignition of the thermite heat pellets 34A, 34B, 34C, in turn causing immediate heating of the cells.

Silicon-carbide (SiC) coated materials, for example those commonly employed in micro-electromechanical systems (MEMS), are preferred materials for forming the module housing, battery enclosure, and lids of the thermal battery of the present invention. Silicon-based structures treated with SiC provide superior chemical stability, as well as highly superior physicochemical, mechanical, and electrical properties, under extreme temperature ranges, as compared to non-coated silicon-based structures.

The conventional approach for depositing a silicon-carbide film on a silicon substrate is the chemical-vapor deposition (CVD) process. When a mixture of $SiH_4$ and propane is employed at atmospheric pressure in the conventional CVD process, temperatures in excess of 1000° C. are required. Researchers have recently developed a low-temperature CVD process, using DSB (1,3-disilabutane: $CH_3$—$SiH_2$—$CH_2$—$SiH_3$) as a single precursor molecule. (See Park et al., "Reaction intermediate in thermal decomposition of 1,3-disilabutane to silicon carbide on Si (111)—Comparative study of Cs+ reactive ion scattering and secondary ion mass spectroscopy", Surface Science, volume 450, pages 117–125, 2000). An embodiment of the present invention utilizes this process to deposit high-quality SiC films on Si-based substrates of the thermal battery.

Optimal thermal battery design requires a selection of material that satisfies, among others, the following criteria: resistance to creep, or deformation over time; resistance to high-temperature oxidation; material toughness; resistance to thermal fatigue; thermal stability; and low density. The thermal battery of the present invention exploits the superior properties of SiC at high temperature to realize an optimal material that satisfies, to a high degree, the stated criteria. Silicon has been the nearly exclusive material of choice for MEMS-based structures, due to compatibility with conventional microelectronics fabrication technology. However, the thermal softening material behavior of silicon, renders silicon a sub-optimal material for high-temperature structures.

In the low-temperature CVD SiC deposition process referenced above, several key advantages are realized over the conventional atmospheric-pressure CVD SiC deposition process. For example, in the low temperature approach, high quality polycrystalline films at temperatures as low as 650° C. can be realized, which are compatible with SiC deposition on Si-based MEMS devices. Second, in the conventional atmospheric pressure CVD process, $SiH_4$/propane gas mixture is utilized. Both gases are dangerously explosive. In the low-temperature approach, the precursor, DSB: 1,3-disilabutane: $CH_3$—$SiH_2$—$CH_2$—$SiH_3$, is benign. It is liquid at room temperature, with a vapor pressure of 27 Torr. Third, with a single precursor, the need for complex gas handling systems is reduced in the low-temperature approach. Fourth, the pre-carbonization step for deposition on Si and $SiO_2$ is eliminated in low-temperature approach. Finally in the low-temperature CVD deposition process, SiC films can be patterned using $SiO_2$ masking and simple lift-off, using HF.

Silicon carbide SiC is therefore applicable as a material for the high-temperature thermal battery of the present invention. SiC creep resistance is outstanding up to 1327° C., and its relatively low expansion and high conductivity provide for resistance to thermal shock, in spite of its relatively low toughness. Chemical Vapor Deposition (CVD) of SiC onto silicon substrates has been identified as a viable option for manufacture. In order to better understand the advantages of SiC, a discussion of the SiC molecule and its structure follows.

Silicon carbide SiC is known as a wide-bandgap semiconductor existing in many different polytypes. All polytypes have a hexagonal frame with a carbon atom situated above the center of a triangle of Si atoms, and underneath, a Si atom belonging to the next layer. The distance, a, between neighboring silicon or carbon atoms is approximately 3.08 Å for all polytypes. The carbon atom is positioned at the center of mass of the tetragonal structure outlined by the four neighboring Si atoms so that the distance between the carbon atom to each of the Si atoms is the same. Geometrical considerations give that this distance, C–Si, is $a \times (3/8)^{1/2}$ i.e., approximately 1.98 Å. The distance between two silicon planes is, thus, $a \times (2/3)^{1/2}$, i.e., approximately 2.52 Å. The height of a unit cell, c, varies between the different polytypes. The ratio c/a, thus, differs from polytype to polytype, but is always close to the ideal for a closed packed structure. This ratio is, for instance, approximately 1.641, 3.271 and 4.908 for the 2H-, 4H- and 6H-SiC polytypes, respectively, whereas the equivalent ideal ratios for these prototypes are $(8/3)^{1/2}$, $2 \times (8/3)^{1/2}$ and $3 \times (8/3)^{1/2}$, respectively. The difference between the polytypes is the stacking order between succeeding double layers of carbon and silicon atoms.

The three most common polytypes, are referred to as 3C, 6H and 4H. If the first double layer is referred to as the "A" position, the next layer that can be placed according to a closed packed structure would be placed on the B position or the C position. The different polytypes would be constructed by permutations of these three positions. The 3C-SiC polytype is the only cubic polytype and it has a stacking sequence ABCABC . . . , or ACBACB . . .

A fundamental difference between SiC and silicon is that while silicon grows in one crystalline structure, SiC is stable in approximately 250 different atomic arrangements or polytypes. The specific atomic arrangements of a SiC structure will influence its physical and electrical properties. The three most common SiC polytypes used in microelectronic applications are 6H, 4H, and 3C. 6H and 4H are two different hexagonal structures, or alpha ($\alpha$) polytypes, and 3C is the only stable cubic structure or beta ($\beta$) polytype of SiC. The beta ($\beta$) polytype of SiC is the structure being proposed for use in the proposed art. Throughout the present specification, the abbreviation SiC is representative of any or all of the polytypes of interest. In the rare exception where the two alpha polytypes need to be differentiated, 6H-SiC and 4H-SiC are used. $\beta$-SiC refers to the cubic polytype in Table 1 below. The table illustrates key electrical characteristics of the three common SiC polytypes and compares them to silicon.

TABLE 1

Comparison of properties os Silicon, β-SiC, 4H—SiC, and 6H SiC
(values in parenthesis refer to doped materials)

|  | Silicon | β-SiC | 6H—SiC | 4H—SiC |
|---|---|---|---|---|
| Bandgap | 1.1 eV | 2.2 eV | 2.9 eV | 3.2 eV |
| Electron mobility | 1500 cm$^2$/Vs (1350 cm$^2$/Vs)[1] | 1000 cm$^2$/Vs | 600 cm$^2$/Vs (800 cm$^2$/Vs)[1] | (1000 cm$^2$/Vs)[1] |
| Hole mobility | 600 cm$^2$/Vs (450 cm$^2$/Vs)[2] | 40 cm$^2$/Vs | 24 cm$^2$/Vs | (120 cm$^2$/Vs)[2] |
| Breakdown Voltage | 3 × 10$^5$ V/cm (6 × 10$^5$ V/cm)[3] | 40 × 10$^5$ V/cm |  | (35 × 10$^5$ V/cm)[3] |
| Saturated electron velocity | 1 × 10$^7$ cm/s | 2.5 × 10$^7$ cm/s | 2 × 10$^7$ cm/s | 2 × 10$^7$ cm/s |
| Thermal conductivity | 1.5 W/cmK | 5 W/cmK | 5 W/cmK | 5 W/cmK |

A second, important, difference between silicon and all three SiC polytypes is the larger bandgap of SiC. The bandgap of a semiconductor is the energy difference between the bottom of the conduction band and the top of the valence band. The bandgap determines the minimum energy required to excite an electron from the valence band to the conduction band. A "wide" bandgap is defined as a bandgap greater than the 1.1 eV bandgap of silicon, and thus SiC is classified as a wide bandgap semiconductor. The use of a semiconductor in electronic devices is dependent upon the ability to control the electron and hole (i.e. charge carrier) movement through the material. The existence of the bandgap and the ability to control the movement of electrons from the valence band to the conduction band where they are mobile is an essential foundation of electronic devices, and is critical in the choice of material for MEMS-based construction.

For silicon, with a bandgap of 1.1 eV, temperatures greater than approximately 250° C. are sufficient to thermally excite electrons across the energy barrier of the bandgap, to populate the conduction band, and to cause a loss of controlled device operation. A relatively larger bandgap enables SiC-based electronic devices to operate in higher temperature environments than silicon-based electronic devices, because the wide bandgap of SiC provides a greater energy barrier to the thermal excitation of the atoms. SiC-based devices have demonstrated long-term operability above 350° C., have successfully functioned to 700° C. and have demonstrated operation as a capacitor at 1000° C. Replacing silicon devices with SiC devices reduces weight and space requirements, since external thermal, or mechanical, systems for mitigating stress-induced effects are not required. Furthermore, SiC devices improve system reliability for high-temperature applications such as the thermal battery of the present invention.

Due to temperature sensitivity, silicon-based devices used in high-temperature applications are contained in environmentally controlled systems, which can be quite sophisticated. Because SiC is capable of operation at much higher temperatures and can withstand more radiation than silicon, the weight of the radiation shielding required for power devices based on SiC materials is reduced.

Generally speaking, the combination of high electric breakdown field, high saturated electron drift velocity, and high thermal conductivity makes SiC an appropriate material for the enclosures of the thermal battery of the present invention. A high breakdown field allows the material to withstand the demands of high power applications. The combination of a high breakdown field and a wide bandgap means that SiC devices are able to operate under higher power conditions than silicon, and also, because of the wide band gap, can be heavily doped and still maintain a desired breakdown voltage. This allows production of devices that meet the required breakdown voltage, with higher efficiencies and faster speeds than equivalent silicon-based devices.

For high-power, high-frequency applications, the higher the electron mobility of the material, the better the performance that can be achieved in devices. The electron mobility in β-SiC is greater than the electron mobility in α-SiC because of reduced phonon scattering in the cubic material. Thus β-SiC would perform better than α-SiC in applications where the highest possible electron mobility is required. Once again, SiC material properties offer higher performance than silicon. The combination of high thermal conductivity and high breakdown field of the SiC material also means that a higher density of integrated devices can be made with SiC than with silicon. This enables smaller electronics packaging and lighter weight for final products. Smaller and lighter products bring economic and operability advantages to most applications.

SiC differs from silicon in several mechanical properties as well. SiC has a Knoop hardness of 2480 kg/mm$^2$, as compared to 850 kg/mm$^2$ for silicon, and wear resistance value of 9.15 compared to the 10 of diamond. SiC has a higher Young's modulus (700 GPa) than Si (190 GPa). SiC also resists chemical attacks more than silicon, is not etched by most acids, and demonstrates greater radiation resistance than silicon. These properties make SiC better suited for highly erosive or corrosive environments than silicon, for example in the thermal battery application of the present invention.

Film growth is an integral part of semiconductor device fabrication and is influenced by atomic arrangements. The arrangement of atoms in the substrate, the solid crystal on which the film is formed, influences the arrangement of atoms in the crystalline film grown on top of it. For a material like SiC with 250 polytypes, that means different substrates will encourage the growth of different polytypes of SiC. Two examples of situations where the arrangement of SiC atoms is important are MEMS processing and gallium nitride (GaN) film growth. For MEMS applications in harsh erosive, corrosive, and/or high temperature environments, β-SiC is preferred over α-SiC because the polycrystalline cubic SiC structure can be grown on silicon, silicon dioxide, and silicon nitride. This simplifies MEMS fabrication and integration into silicon-based packages. β-SiC is also a promising substrate for the cubic form of GaN.

As described above, the process of fabricating a MEMS-based thermal battery in accordance with the present invention utilizes the widely-used semiconductor fabrication process of Chemical Vapor Deposition (CVD). CVD is a series of chemical reactions which transform gaseous molecules (precursors) into solid material in the form of thin film or powder, on the surface of a substrate. The CVD process constitutes the following steps: 1) Vaporization and transport of precursor molecules into the reactor; 2) Diffusion of precursor molecules to the surface; 3) Adsorption of precursor molecules to the surface; 4) Decomposition of precursor molecules on the surface and incorporation into sold films; and 5) Recombination of molecular by-products and desorption into gas phase.

The process begins with a single-crystal silicon ingot, grown in, for example, a Czochralski crystallizer, then sliced into wafers. Wafers are chemically and physically polished. The polished wafers serve as the base material (substrate) for devices; as in the case of the MEMS-based thermal battery of the present invention, where processing the silicon wafer begins with the formation of an optional silicon dioxide ($SiO_2$) layer on top of the silicon wafer substrate. The optional $SiO_2$ layer may be formed either by oxidizing the top silicon layer or by providing a $SiO_2$ layer through chemical vapor deposition (CVD).

The wafer is next masked with a polymer photoresist (PR), and the pattern to be etched onto the optional $SiO_2$ layer is placed over the PR, where the wafer is exposed to ultraviolet irradiation. If the mask is a positive photoresist, the ultraviolet light causes scission in the polymer, so that the exposed areas will dissolve when the wafer is placed in the developer (battery components are likely to require negative photoresist). On the other hand, when a negative photoresist is exposed to ultraviolet irradiation, crosslinking of the polymer chains occurs and the unexposed areas dissolve in the developer. In either case, the undeveloped portion of the photoresist serves to protect the covered areas from etching. Once the exposed areas of $SiO_2$ are etched to form trenches (either by means of wet etching or plasma etching), the remaining PR is removed.

Next the wafer is placed in a furnace containing gas molecules of the desired dopant 1,3-DSB precursor, and CVD SiC is carried out. SiC is then diffused into the exposed surface of the silicon substrate. After diffusion of the dopant into the desired depth in the wafer, it is removed and then covered with $SiO_2$ film, for example by a CVD process. The sequence of masking, etching, CVD, and metallization continues until the desired device is formed.

Design of the thermal battery of the present invention according to the above process involves a number of important design considerations. First, the geometric integrity imposed by the tight tolerance of a few microns requires structures with high specific stiffness. For example, the anode-cathode spacing may be only a few microns in length. High thermal stress and the asymmetric geometrical shape (lozenge shape) of the cathode and anode induce axial deflection as well as radial expansion, which may cause instantaneous performance deterioration and electrolyte leakage.

Second, as the temperature rises from 900° K (627° C.) to 1000° K (727° C.), the yield strength of silicon drastically decreases, from 1 GPa to 100 MPa. This thermal softening behavior should be taken into consideration. As a result, wall temperature of an all-silicon device must be kept below 950° K (677° C.). The following considerations serve to eliminate this problem. First, a choice of one of two groups of Alkali Carbonate Eutectic Salt compositions can be employed as the electrolyte. Since the electrolytic carbonate salts have a melting temperature range of 490–520° C., the heat flux generated by thermite (assuming that the heat source is formed of thermite) reaction is expended in melting the solid electrolyte during activation. Second, a thin film of Silicon Carbide (SiC), of thickness, for example, ranging between 30 and 50 nm, is chemically deposited on top of the silicon dioxide coating that was initially deposited on the silicon substrate, the backbone of the proposed thermal battery. A SiC thin film coating operates as a thermal barrier structure, amongst other things, between the heat source (for example the cell components 54) and the battery module housing 60 on one hand, and between the internal compartments 70 and the external surroundings of the battery enclosure 62. Assuming that each thermal battery system contains four (4) cell stack compartments 70, compartment-to-compartment thermal protection should be provided, for example by introducing a thin (30–50 nm thick) coating of silicon carbide on each barrier.

During the CVD-SiC deposition process, it is important to maintain as low a reactant variation as possible. In some cases, it may be necessary to reduce the flow velocity of the reactant species in order to ensure a complete reaction and perfect film thickness. In others, it may be necessary to increase flow velocity of the reactant species and to introduce turbulence, in order to enhance the reaction on the surface of the substrate. Different applications call for different reaction chamber configurations.

In considering thermal battery design according to the present invention, it should be considered that different phenomena are important at different pressure and temperature ranges. For industrial-scale reactors, the commercial deposition process should combine high reaction rates with well-defined microcrystallinity, phase composition, and uniformity concerning layer thickness. A typical reactor would operate at 800–1050° C. with a yield of 92%, especially at very-low pressures. Reaction time is in the range of 2 hrs, after which a thickness of 50 micron of SiC is achieved. Normally a laminar flow is preferred in a LPCVD reactor in order to keep the lower Peclet number to ensure uniform thickness along the length of the reactor.

The present invention is amenable to formation of thermal batteries that are small in size, yet are capable of reliable performance over a wide range of operating conditions. It is conceivable that MEMS technology may be employed to form thermal batteries in accordance with the present invention on the microscopic (micrometer-to-millimeter) scale.

While this invention has been particularly shown and described with references to preferred embodiments thereof, it will be understood by those skilled in the art that various changes in form and details may be made herein without departing from the spirit and scope of the invention as defined by the appended claims.

I claim:

1. A thermal battery comprising:
    an anode;
    a cathode;
    an electrolyte between the anode and cathode, the electrolyte having a first inactive state in which the electrolyte is electrically insulative, and having a second active state in which the electrolyte is electrically conductive between the anode and cathode;
    a heat element for transforming the electrolyte from the first inactive state to the second active state; and
    a housing containing the anode, cathode, electrolyte, and heat element including a silicon carbide (SiC) material.

2. The thermal battery of claim 1 wherein a first interface between the electrolyte and one of the anode and cathode is non-planar.

3. The thermal battery of claim 2 wherein the first interface is one of semi-spherical, elliptical, parabolic, or faceted.

4. The thermal battery of claim 2 wherein a second interface between the electrolyte and the other of the anode and cathode is non-planar.

5. The thermal battery of claim 2 wherein the second interface is one of semi-spherical, elliptical, parabolic, or faceted.

6. The thermal battery of claim 1 wherein the heat element is adjacent one of the anode and cathode and wherein a third interface of the heat element and the one of the anode and cathode is non-planar.

7. The thermal battery of claim 6 further comprising a second heat element adjacent the other of the anode and cathode and wherein a fourth interface of the second heat element and the other of the anode and cathode is non-planar.

8. The thermal battery of claim 7 wherein the third and fourth interfaces are one of semi-spherical, elliptical, parabolic, or faceted.

9. The thermal battery of claim 1 wherein the electrolyte is solid in the first inactive state and liquid in the second active state, and wherein the heat element provides heat for transforming the electrolyte from the first inactive state to the second active state.

10. The thermal battery of claim 1 further comprising a separator element for preventing the flow of electrolyte in the second active state.

11. The thermal battery of claim 10 wherein the separator element encompasses a base portion and side walls of the anode.

12. The thermal battery of claim 11 wherein the separator element includes extension arms that extend beyond the side walls of the anode to ensure mechanical separation of the anode and cathode when the electrolyte is in the first inactive state.

13. The thermal battery of claim 1 wherein at least a separator element is positioned between two other components of said thermal battery.

14. The thermal battery of claim 13 wherein said separator element is positioned between the electrolyte and the anode or the cathode.

15. The thermal battery of claim 13 wherein said separator element is positioned between the heat element and the anode or the cathode.

16. The thermal battery of claim 13 wherein said separator element comprises vanadium.

17. The thermal battery of claim 13 wherein said separator element consists essentially of a composite mixture of vanadium and a zeolite-type molecular sieve.

18. The thermal battery of claim 17 further wherein said composite mixture is fabricated into a thin, compacted foil and bent into a shallow cup shape so as to at least partially enclose a component of said battery.

19. The thermal battery of claim 13 wherein said separator element consists essentially of a composite mixture of vanadium, a zeolite-type molecular sieve, and a solid, three-component, eutectic electrolyte.

20. The thermal battery of claim 13 wherein said separator element consists essentially of a composite mixture of about 59–79 wt. % vanadium, 1–2 wt. % of a zeolite-type molecular sieve, and 10–30 wt. % of a solid, three-component, eutectic electrolyte.

21. The thermal battery of claim 13 wherein said separator element consists essentially of a composite mixture of about 75 wt. % vanadium, 17 wt. % of a zeolite-type molecular sieve, and 8 wt. % of a solid, three-component, eutectic electrolyte.

22. The thermal battery of claim 21 wherein said zeolite-type molecular sieve is zeolite CBV-100.

23. The thermal battery of claim 21 wherein said zeolite-type molecular sieve is a porous clay.

24. The thermal battery of 21 wherein said solid, three-component, eutectic electrolyte is selected from the group consisting of: (A) a mixture of about 38–49 wt. % lithium carbonate, 26–37 wt. % sodium carbonate, and 20–30 wt. % potassium carbonate; and (B) a mixture of about 34–44 wt. % lithium carbonate, 33–44 wt % sodium carbonate, and 17–28 wt. % rubidium carbonate.

25. The thermal battery of claim 1 wherein the housing comprises a silicon-carbide (SiC) treated substrate.

26. The thermal battery of claim 25 wherein the substrate comprises a silicon substrate.

27. The thermal battery of claim 26 wherein the substrate comprises a silicon substrate treated with $SiO_2$ prior to the SiC treatment.

28. The thermal battery of claim 25 wherein the housing is hermetically sealed.

29. The thermal battery of claim 28 wherein the housing further comprises a microvent that releases pressure from within the housing.

30. The thermal battery of claim 26 wherein the housing comprises a cavity etched in the substrate, within which the anode, cathode, electrolyte and heat element are deposited.

31. The thermal battery of claim 26 wherein the housing comprises multiple cavities etched in the substrate, within which multiple unit cells, each unit cell comprising an anode, cathode, electrolyte and heat element, are deposited.

32. The thermal battery of claim 24 wherein multiple unit cells are stacked within the housing, each unit cell comprising an anode, cathode, electrolyte.

33. The thermal battery of claim 32 wherein adjacent unit cells share a common heat element.

34. The thermal battery of claim 1 further comprising a pyrotechnic initiator for activating the heat element.

35. The thermal battery of claim 1 wherein the heat element comprises a pyrotechnic charge.

36. The thermal battery of claim 35 wherein said pyrotechnic charge comprises a mixture of chemical components which produces an exothermic reaction upon being heated to ignition temperature, said exothermic reaction producing only reaction byproducts which are solids at ambient conditions.

37. The thermal battery of claim 36 wherein said pyrotechnic charge consists essentially of thermite.

38. The thermal battery of claim 36 wherein said pyrotechnic charge consists essentially of a blended mixture of about 8 parts by weight $Fe_2O_3$ and about 3 parts by weight Al powder.

39. The thermal battery of claim 36 wherein said pyrotechnic charge consists essentially of bisnitro cobalt-3-perchlorate.

40. The thermal battery of claim 34 wherein the chemical components which comprise said pyrotechnic charge are compacted and formed into a lozenge-like shape.

41. The thermal battery of claim 34 wherein said pyrotechnic charge is in contact with an initiator strip.

42. The thermal battery of claim 34 wherein said pyrotechnic charge is at least partially wrapped in a fuse roll comprising magnesium.

43. The thermal battery of claim 34 wherein said pyrotechnic charge is ignited by an initiator strip consisting essentially of magnesium powder, Teflon™ and Viton™.

44. The thermal battery of claim 43 wherein said initiator strip consists essentially of about 54 wt. % magnesium powder, 30 wt. % Teflon™ and 16 wt. % Viton™.

45. The thermal battery of claim 1 wherein said electrolyte composition consists essentially of a blended, three-component eutectic salt mixture.

46. The thermal battery of claim 1 wherein said electrolyte composition consists essentially of a ternary eutectic mixture of alkali carbonate salts having a melting temperature in the range of about 490° C.–520° C.

47. The thermal battery of claim 1 wherein said electrolyte composition is selected from the group consisting of: (A) a mixture of lithium carbonate, sodium carbonate, and potassium carbonate; and (B) a mixture of lithium carbonate, sodium carbonate, and rubidium carbonate.

48. The thermal battery of claim 1 wherein said electrolyte composition is selected from the group consisting of:

(A) a mixture of about 38–49 wt. % lithium carbonate, 26–37 wt. % sodium carbonate, and 20–30 wt. % potassium carbonate; and (B) a mixture of about 34–44 wt. % lithium carbonate, 33–44 wt % sodium carbonate, and 17–28 wt. % rubidium carbonate.

49. The thermal battery of claim 1 wherein said electrolyte composition is selected from the group consisting of: (A) a mixture of about 43.5 wt. % lithium carbonate, 31.5 wt. % sodium carbonate, and 25 wt. % potassium carbonate; and (B) a mixture of about 39 wt. % lithium carbonate, 38.5 wt % sodium carbonate, and 22.5 wt. % rubidium carbonate.

50. The thermal battery of claim 45 wherein the electrolyte composition is compacted and formed into a lozenge-like shape.

51. The thermal battery of claim 45 wherein said electrolyte composition contains a surfactant.

52. The thermal battery of claim 45 wherein said electrolyte composition contains about 0.005–10 wt % of sodium lauryl sulfate.

53. The thermal battery of claim 52 wherein said electrolyte composition is compacted and formed into a lozenge-like shape.

54. The thermal battery of claim 45 wherein said electrolyte composition contains about 1 wt. % of sodium lauryl sulfate.

55. The thermal battery of claim 1 wherein said anode comprises an alkali/alkaline earth metal alloy.

56. The thermal battery of claim 1 wherein said anode comprises a metal alloy consisting essentially of about 15–25 wt. % of lithium and 75–85 wt. % of germanium.

57. The thermal battery of claim 1 wherein said anode comprises a metal alloy consisting essentially of about 20 wt. % of lithium and 80 wt. % of germanium.

58. The thermal battery of claim 55 wherein said metal alloy is pressed into thin foil of about 0.01–1.00 mm in thickness for use as said anode element.

59. The thermal battery of claim 55 further wherein said anode is at least partially enclosed in a composite mixture consisting essentially of vanadium, metal carbonate salt electrolyte, and a zeolite-type molecular sieve fabricated into a cup-like shape to act as a separator.

60. The thermal battery of claim 1 wherein said cathode consists essentially of a compound selected from the group consisting of $V_2O_5$, $V_2O_3$ and $VO_2$.

61. The thermal battery of claim 1 wherein said cathode consists essentially of $V_2O_5$ having at least some degree of porosity.

62. The thermal battery of claim 60 wherein said cathode element is fabricated in a lozenge-like shape.

* * * * *